United States Patent

[11] 3,607,693

| [72] | Inventors | Hans-Georg Heine<br>Krefeld;<br>Karl Fuhr, Krefeld; Hans Rudolph,<br>Krefeld-Bockum; Hermann Schnell,<br>Krefeld-Uerdingen, all of Germany |
|---|---|---|
| [21] | Appl. No. | 838,638 |
| [22] | Filed | July 2, 1969 |
| [45] | Patented | Sept. 21, 1971 |
| [73] | Assignee | Farbenfabriken Bayer Aktiengesellschaft<br>Leverkusen, Germany |
| [32] | Priority | July 26, 1968 |
| [33] |  | Germany |
| [31] |  | P 17 69 854.3 |

[54] POLYESTER COMPOUNDS WHICH ARE HARDENABLE BY ULTRAVIOLET RADIATION IN THE PRESENCE OF AN α-SUBSTITUTED BENZOIN ETHER
5 Claims, No Drawings

[52] U.S. Cl....................................................204/159.15,
117/73, 117/93.31, 117/124 R, 117/148,
204/159.23, 260/28, 260/40 R, 260/863, 260/866
[51] Int. Cl........................................................ C08f 1/00,
C08f 21/00

[50] Field of Search............................................204/159.15,
159.23; 96/115 P, 115

[56] References Cited
UNITED STATES PATENTS

| 2,760,863 | 8/1956 | Plambeck.................... | 96/115 |
|---|---|---|---|
| 3,330,659 | 7/1967 | Wainer........................ | 204/159.23 |
| 3,376,136 | 4/1968 | Seide............................ | 96/115 |

*Primary Examiner*—John C. Bleutge
*Assistant Examiner*—Richard B. Turer
*Attorney*—Connolly and Hutz

ABSTRACT: The present invention relates to compounds which contain at least one activated carbon-carbon double bond and which can be polymerized by ultraviolet irradiation and to mixtures of such compounds to which special benzoins substituted in the α-position are added as photosensitizers. While the addition of known photosensitizers of this kind to the polymerizable compounds has the disadvantages that the compositions are insufficiently reactive when irradiated with ultraviolet rays and especially their stability in dark storage is quite unsatisfactory, these disadvantages are avoided by the use of α-substituted benzoin ethers as photosensitizers according to the invention.

POLYESTER COMPOUNDS WHICH ARE HARDENABLE BY ULTRAVIOLET RADIATION IN THE PRESENCE OF AN α-SUBSTITUTED BENZOIN ETHER

A great number of sulfur- and halogen-containing compounds, *inter alia*, have been mentioned in the literature as compounds which initiate and accelerate photopolymerization. Also recommended are benzoin (U.S. Pat. No. 2,367,661) and some benzoin derivatives, such as certain α-substituted benzoins (U.S. Pat. No. 2,448,828; FP No. 1,450,589).

None of these compounds has been industrially accepted. The main causes for this failure are the insufficient reactivity and the unsatisfactory stability in dark storage of the polymerizable compounds which are admixed with these photosensitizers.

A group of α-substituted benzoins has now been found the mixtures of which with polymerizable compounds and mixtures of such compounds do not have the aforesaid disadvantages. These are excellently stable in dark storage and are rapidly polymerized under the influence of UV radiation.

The object of the invention therefore comprises compounds which can be polymerized by UV irradiation and mixtures of such compounds containing as photosensitizers α-substituted benzoin ethers of the formula.

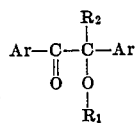

in which Ar stands for an aromatic radial which may be substituted by alkyl, alkoxy and/or halogen; $R_1$ and $R_2$ are the same or different and for optionally substituted alkyl, aryl and aralkyl; and $R_1$ and $R_2$ may also be linked to one another via a further oxygen atom.

Examples of such sensitizers are: α-methyl-benzoin-methyl ether, α-pheynl-benzoin-methyl ether, α-phenyl-benzoin-ethyl ether, α-allyl-benzoin-ethyl ether ($n_D^{20}$ 1.5600), α-benzyl-benzoin-ethyl ether (m.p. 100–101° C.), α-hydroxy-methyl-benzoin-isopropyl ether ($n_D^{25}$ 1.5574), α-acetoxymethyl-benzoin-isopropyl ether (m.p. 66–67° C.), 4-benzoyl-4-phenyl-1,3-dioxolan (m.p. 66–67° C.), α-(βcyanoethyl)-benzoin-ethyl ether (m.p. 62° C.), α-(βcarbothoxy-ethyl)-benzoin-ethyl ether ($n_D^{25}$ 1.5042), α-ethyl-benzoin-ethyl ether ($n_D^{20}$ 1.5470) α-allyl-benzoin-ethyl ether ($n_D^{20}$ 1.5596) and 4,4'-dichloro-α-methyl-benzoin-ethyl ether ($n_D^{30}$ 1.5818).

Those compounds are particularly effective and therefore particularly advantageous in which $R_2$ is of aliphatic nature, primarily those in which $R_2$ stands for the grouping —$CH_2$ 13 O—$R_3$ denotes hydrogen, alkyl or acyl or is an alkylene linked to $R_1$ via a further oxygen atom; and, furthermore, compounds in which $R_2$ stands for the group

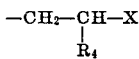

in which $R_4$ denotes hydrogen or methyl and X denotes CN, COOH, COO-alkyl and $CONH_2$.

The compounds can be obtained in know manner by the reaction of alkylating and arylating agents, such as alcohols, alkyl halides, Grignard compounds, formaldehyde or (meth)acrylic acid derivatives, with benzils, benzoins, α-substituted benzoins or benzoin ethers.

These compounds are expediently used in amounts of from about 0.1 to about 5 percent by weight, preferably from about 0.5 to about 2.5 percent by weight, either by themselves or in mixture with one another.

Suitable polymerizable compounds are all substances the carbon-carbon double bonds of which are activated, for example, by halogen atoms or carbonyl, cyanide, carboxy, ester, amide, ether or aryl groups as well as by carbon double or carbon triple bonds. Examples are: vinyl chloride, vinylindene chloride, vinyl methyl ketone, acrolein, acrylic acid methyl ester, methacrylic acid ethyl ester, acrylamide, methacrylamide, acrylonitrile, methacrylonitrile, chloroprene, vinyl ethyl ether, and styrene.

It is particularly advantageous to use moulding and coating masses consisting of mixtures of unsaturated polyesters and copolymerizable monomeric compounds; the unsaturated polyesters comprise, as is usual, polycondensation products obtained from α,β-unsaturated dicarboxylic acids, such as maleic acid, fumaric acid, itaconic acid, metaconic acid and citraconic acid, with polyhydric alcohols, such as ethylene glycol, diethylene glycol, propane-, butane-, nexane-diol, trimethylol-propane and pentaerythritol. Part of the unsaturated acids may be replaced with saturated acids, for example, succinic acid, glutaric acid, adipic acid, phthalic acid, tetrachlorophthalic acid, hexachloro-endomethylene-tetrahydrophthalic acid and trimellitic acid. Other modifications can be achieved by the incorporation of monohydric alcohols, such as butanol, butyl glycol and tetrahydrofurfuryl alcohol, as well by the incorporation of monobasic acids, such as benzoic acid, oleic acid, linseed fatty acid and dehydrated castor oil fatty acid. It is also possible to use so-called air-drying moulding masses which contain, besides the radicals of α,β-unsaturated dicarboxylic acids, β,γ-unsaturated ether radicals, be it as constituents of the polyesters, e.g. according to British specification No. 810,222, be it as constituent of further components of the mixture.

The copolymerizable monomeric compounds comprise the compounds which are usually applied in polyester technique and contain vinyl groups which may be substituted in the α-position or contain allyl groups which may be substituted in the β-position, for example: styrene, vinyl-toluene, divinyl-benzene, vinyl acetate, acrylic acid and its esters, acrylonitrile, methacrylic acid and the corresponding derivatives thereof, as well as allyl esters, such as allyl acetate, allyl acrylate, phthalic acid diallyl ester, triallyl phosphate and triallyl cyanurate.

The photopolymerizable compounds or mixtures may be stabilized by the addition of conventional inhibitors, such as β-benzoquinone, hydroquinone, 3-methyl-pyrocatechol or copper compounds, e.g. copper naphthenate, in the known amounts, and they may contain other conventional additives.

If desired, polymerization catalysts, e.g. peroxides, may be added in amounts of about 0.1 to about 4 percent by weight. Suitable peroxides are, for example, tert.-butyl perbenzoate, dicumyl peroxide, benzoyl peroxide and cyclohexanone peroxide. Furthermore, the addition of peroxides, particularly of methyl ethyl ketone peroxide, is recommended in the case where it is desirable to exclude slight discolorations of the cured products, such as may occur under the influence of light during irradiation, but possibly also during storage.

In combination with the use use ketone peroxides, there may be added metal compounds, such as cobalt, zirconium masses to vanadium naphthenate, or metal cholales, such as cobalt and zirconium acetyl-acetonate, in order to accelerate the curing. On the other hand, the storage stability of the masses is reduced when peroxides and metal accelerators are present at the same time. It is therefore recommended for the production of varnish coatings to work according to the so-called active primer method where the coating mass is applied to a peroxide-containing layer previously applied to the substrate.

It is particularly advantageous to use the benzoins to be used according to the invention for those coating masses to which paraffin or wax or waxlike substances have been added, which float when the polymerization starts and prevent the inhibiting effect of atmospheric oxygen.

For the protection of substrates which are sensitive to light, for example, light-colored woods, small amounts of conventional UV-absorbs may be added to the moulding and coating masses without substantially impairing the reactivity. Furthermore, small amounts or conventional carriers and fillers as well as thixotrophy agents, such as glass fibers, synthetic fibers, silicic acid and talc, may be present during the photopolymerization.

As radiation source for carrying out the photopolymerization, there may be used natural sunlight or artificial radiators the emission of which lies in the range from 250–500 $\mu$, preferably 300–400 $\mu$. Mercury vapor, xenone and tungsten lamps are suitable, for example. Even under the ultraviolet and visible radiation of fluorescent lamps which are poor in energy and have an emission of 300–580 $\mu$, the masses according to the invention rapidly harden to give almost colorless mouldings and coatings.

In the production of mouldings from masses sensitized according to the invention, it is particularly advantageous that the masses can be cured by appropriately dosed irradiation without appreciable heat effect; even fairly large mouldings can thus be obtained free from cracks. In the absence of peroxides and metal accelerators, the curing may be also interrupted by darkening and completed at any time after storage of the prepolymers so obtained.

Example 1

An unsaturated polyester prepared by condensation of 152 parts by weight maleic acid anhydride, 141 parts by weight phthalic acid anhydride, and 195 parts by weight propane-diol-1,2 is mixed with 0.045 parts hydroquinone and dissolved in styrene to give a concentration of 65 percent by weight.

Portions of 100 parts by weight of this resin supply form are admixed with 2 parts by weight of known photosensitizers, on the one hand, and of photosensitizers according to the invention on the other hand, and the mixtures are stored at 60° C. with the exclusion of light until gelling occurs. Table 1 contains the sensitizers and the values for storage stability at 60° C.

TABLE I

Stability in dark storage of the supply form of a typical polyester resin with an addition of 2 parts by weight of sensitizer.

| Sensitizer | Storage stability at 60° C. |
| --- | --- |
| benzoin | less than 1 day |
| benzoin-ethyl ether | less than 1 day |
| α-methyl-benzoin-methyl ether | more than 10 days |
| α-phenyl-benzoin-methyl ether | more than 10 days |
| α-phenyl-benzoin-ethyl ether | more than 10 days |
| α-(β-cyanoethyl)-benzoin-ethyl ether | more than 10 days |
| α-(β-carboethoxyethyl)-benzoin-ethyl ether | more than 10 days |
| 4-benzoyl-4-phenyl-1,3-dioxolan | more than 10 days |
| α-ethyl-benzoin-ethyl ether | more than 10 days |
| α-allyl-benzoin-ethyl ether | more than 10 days |
| α-allyl-benzoin-isopropyl ether | more than 10 days |
| α-benzyl-benzoin-ethyl ether | more than 10 days |

Example 2

Portions of 100 parts by weight of the resin supply form described in Example 1 are admixed with 20 parts by weight styrene, 1 part by weight of 10 percent by weight solution of paraffin (m.p. 52–53° C.) in toluene, and with equimolar amounts of known photosensitizers, on the one hand, and of photosensitizers according to the invention, on the other hand. The solutions so obtained are applied to glass plates with the aid of a film extruder (500 $\mu$) and illuminated with the radiation of a fluorescent lamp (Osram–L 40 W/70-1) from a distance of 5 cm.

Table 2 contains the paraffin floating times and the periods of time until pencil hardness >6 H is attained.

TABLE 2

| Sensitizer | Additive as parts by weight, referred to resin supply form | Floating time of paraffin after min. | Pencil hardness >6 H after min. |
| --- | --- | --- | --- |
| benzoin | 2.12 | 2.5 | 14.0 |
| benzoin-ethyl ether | 2.40 | 0.63 | 5.5 |
| α-methyl-benzoin-methyl ether | 2.40 | 0.94 | 8.5 |
| α-phenyl-benzoin-methyl ether | 3.02 | 1.3 | 28 |
| α-phenyl-benzoin-ethyl ether | 3.16 | 1.4 | 32 |
| α-hydroxymethyl-benzoin-isopropyl ether | 2.84 | 0.70 | 6.0 |
| 4-benzoyl-4-phenyl-1,3- | 2.54 | 1.1 | 8.0 |
| α-(β-cyanoethyl)-benzoin ethyl ether | 2.93 | 0.67 | 5.5 |
| α-(β-carboethoxy-ethyl)-benzoin-ethyl ether | 3.40 | 0.50 | 5.0 |
| α-ethyl-benzoin-ethyl ether | 2.68 | 0.55 | 15.0 |
| α-allyl-benzoin-ethyl ether | 2.80 | 0.50 | 4.5 |
| α-allyl-benzoin isopropyl ether | 3.30 | 0.75 | 7.0 |

Example 3

An unsaturated polyester prepared by condensation of 1765 parts by weight maleic acid anhydride, 756 parts by weight ethylene glycol, 405 parts by weight butane-diol-1,3, and 1540 parts by weight trimethylol-propane diallyl ether in the presence of 0.83 parts by weight hydroquinone is dissolved in styrene to give a concentration of 70 percent by weight.

Portions of 100 parts by weight of this supply form are admixed, after the addition of 1 part by weight of a cobalt naphthenate solution (20 percent by weight in toluene) with various sensitizers according to the invention.

The solutions are applied to glass in layers of 500 $\mu$ thickness and illuminated from a distance of 5 cm. with the fluorescent lamp described above until the film has gelled. The prepolymer is then illuminated by the radiation of a mercury vapor high-pressure burner (Philips HPK 125 W/L) from a distance of 10 cm. until the surface of the layers is tack free. The pencil hardness then amounts to >6 H.

Table 3 contains the periods of time required for gelling under the fluorescent lamp and for curing.

Table 3

| Additive referred to resin supply form percent by weight | Gelling under fluorescent lamp after min. | Curing under Hg high pressure burner, pencil hardness >H after min. |
| --- | --- | --- |
| 2 α-hydroxymethyl-benzoin-isopropyl ether | 0.6 | 6 |
| 2 4-benzoyl-4phenyl-1,3-dioxolan | 0.7 | 6 |
| 2 α-(β-cyanoethyl)-benzoin-ethyl ether | 0.5 | 5 |
| 2 α-(βcarboethoxy-ethyl)-benzoin-ethyl ether | 0.5 | 5 |

EXAMPLE 4

10 g. of freshly distilled acrylic acid methyl ester are mixed with 0.1 g. α-(βcarboethoxyethyl)-benzoin-ethyl ether and illumination is carried out from a distance of 10 cm. with a mercury vapor high pressure burner (Philips HPK 125 W/L) through quartz on a water bath at 24° C. The solution of the sensitizer in the monomer is under a nitrogen atmosphere in a quartz glass the inner diameter of which amounts to 1.7 cm. The illumination time amounts to 2½ minutes.

Immediately after illumination, the quartz glass is placed in a mixture of ice and sodium chloride in order to prevent heat polymerization. The solution of the polymer in the monomer, including the proportion of solid polymer which is present on the inner side of the quartz (the side facing the mercury vapor high-pressure burner), is rinsed with small amounts of a solvent (methylene chloride) into a small round flask. Any nonpolymerized monomeric components and the solvent are then distilled off in a rotary evaporator. After drying the residue in a vacuum drying cabinet until the weight is constant at 60° C., the amount of polymer is determined. It amounts to 11.8 percent by weight. If the sensitizer is not present, the amount of polymer is less than 0.1 percent.

We claim:

1. A moulding and coating composition hardenable by ultraviolet irradiation, said composition comprising a mixture of an unsaturated polyester derived from a dicarboxylic a acid condensed with a polyol, a copolymerizable monomeric compound and, as photosensitizer, an α-substituted benzoin ether of the formula

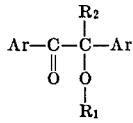

wherein Ar is an unsubstituted aromatic radical or an aromatic radical substituted by alkyl, alkoxy or halogen and $R_1$ and $R_2$ are the same of different substituents and stand for unsubstituted or substituted alkyl, aryl and aralkyl or $R_1$ and $R_2$ are linked to one another through a further oxygen atom.

2. The moulding and coating composition of claim 1 wherein $R_2$ is of aliphatic nature.

3. The moulding and coating composition of claim 1 wherein $R_2$ is —$CH_2$13 O—$R_3$ wherein $R_3$ is hydrogen, alkyl or acyl.

4. The moulding and coating composition of claim 1 wherein $R_2$ is —$CH_2$—CH—X. wherein $R_4$ is hydrogen or methyl and X

is CN, COOH, COO-alkyl or $CONH_2$.

5. A process for curing the moulding and coating composition of claim 1 which comprises irradiating the same with UV rays.

UNITED STATES PATENT AND TRADEMARK OFFICE
CERTIFICATE OF CORRECTION

PATENT NO. : 3,607,693
DATED : September 21, 1971
INVENTOR(S) : Hans-Georg Heine et al It is certified that error appears in the above-identified patent and that said Letters Patent are hereby corrected as shown below:

Col. 1, line 53, "$-CH_2 13$" should read -- $-CH_2-$ --.

Col. 6, line 9, "$-CH_2 130-R_3$" should read -- $-CH_2-O-R_3$ --;

line 12, "$-CH_2-CH-X$" should read -- $-CH_2-\underset{R_4}{CH}-X$ --;

line 16, "$R_4$" should be deleted.

𝔖igned and 𝔖ealed this

*thirtieth* 𝔇ay of *March 1976*

[SEAL]

Attest:

RUTH C. MASON
*Attesting Officer*

C. MARSHALL DANN
*Commissioner of Patents and Trademarks*